Oct. 9, 1951          J. R. HOLLINS          2,570,811
DIRECTION SWITCH FOR VEHICLE LIGHTING CIRCUITS
Original Filed Dec. 24, 1948
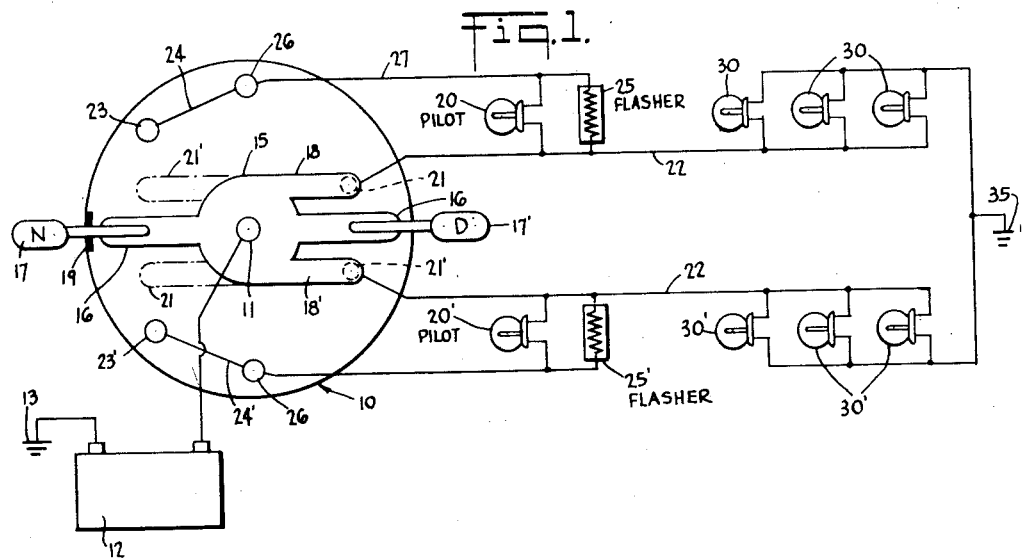
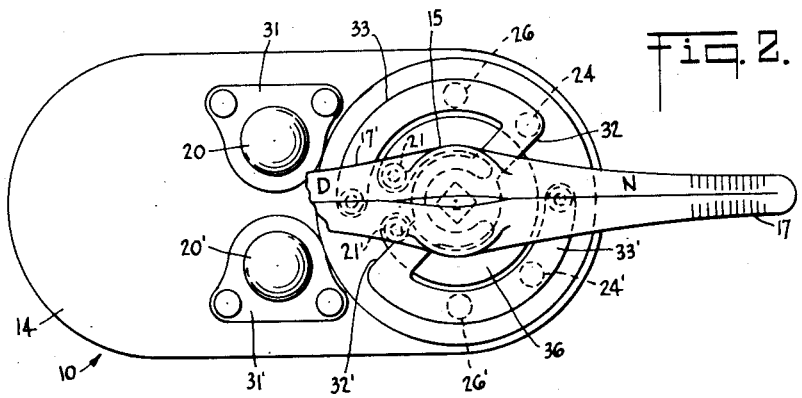
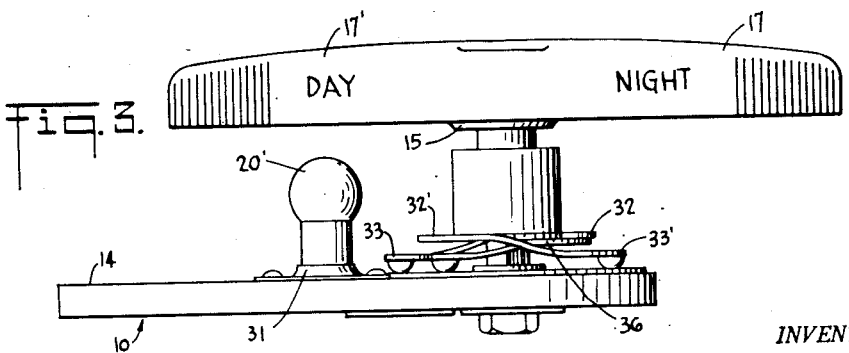
INVENTOR.
JESSE R. HOLLINS
BY
ATTORNEY Patented Oct. 9, 1951

2,570,811

UNITED STATES PATENT OFFICE 2,570,811

DIRECTION SWITCH FOR VEHICLE LIGHTING CIRCUITS

Jesse R. Hollins, Brooklyn, N. Y.

Original application December 24, 1948, Serial No. 67,149. Divided and this application May 27, 1950, Serial No. 164,676

3 Claims. (Cl. 175—373)

This invention relates to a control switch for vehicle lighting circuits and, more particularly to a control switch for vehicle clearance or marker lamps, and effective to condition such lamps to act as flashing directional signals, or as flashing emergency stop lights, or to condition the lamps for steady illumination as vehicle width indicators, this being a division of my application Serial No. 67,149, filed December 24, 1948, now Patent No. 2,514,604.

In accordance with the requirements of various State highway laws, commercial vehicles of sizes above a preset maximum height, length, width or capacity are required to be equipped with marker lamps on the sides of the body of the truck and/or trailer. These lamps are known as clearance lights, and serve to indicate particularly the extreme width of the vehicle to approaching or overtaking traffic. Generally, such lamps are placed at the upper and lower front and rear corners of the vehicle and at the midsection of the corner posts.

The present invention provides a novel control switch whereby such clearance lamps may be illuminated steadily to serve as clearance indicators, may be selectively flashed to serve as turn indicators, or may all be flashed to serve as an emergency stop warning. The cost of installation is low as the switch is designed to utilize existing lamp circuits and, furthermore, the switch operation is substantially foolproof. The switch may be utilized for directional or emergency stop indications in the daylight when the clearance lamps normally are not illuminated. To indicate the selected operation of the lights, suitable pilot lamps are incorporated in the control switch.

It is accordingly among the objects of this invention to provide a novel, multi-selection control switch and associated control circuits for vehicle indicator lamps.

Another object is to provide such a switch capable of selectively lighting vehicle clearance lamps as steady clearance indicators, as flashing turn indicators, or as flashing emergency stop indicators.

A further object is to provide such a switch having a night-time operating position and a daytime operating position.

These, and other objects, advantages and novel features of the invention will be apparent from the following description and the accompanying drawing. In the drawing:

Fig. 1 is a schematic wiring diagram of a vehicle lighting control system embodying the invention;

Fig. 2 is a plan view of one form of the control switch; and

Fig. 3 is a side elevation of the switch of Fig. 2.

Referring to the drawing, Fig. 1 illustrates the control switch 10 of the invention as applied to lighting circuits controlling the illumination of sets of clearance lamps 30 and 30' disposed, respectively on the right and left sides of the vehicle. All of the lamps 30 and 30' have one terminal connected to ground as at 35 or a common ground.

Switch 10 has a central terminal or contact 11 which is connected to one terminal of the vehicle battery 12, the other battery terminal being grounded, in the usual manner, as at 13. Terminal 11 is mounted on an insulating base plate 14, and acts as a pivot center for the switch contact arm 15. Arm 15 is formed with elongated, radial contacts 16, 16', with contact 16 shown schematically as having a "night" operating handle 17 on its outer end, and contact 16' as having a "day" operating handle 17' on its outer end. A pair of shorter contacts 18, 18' project from pivot contact 11, in laterally spaced relation to each other and parallel to contact 16'.

Base plate 14 carries a pair of contacts 21, 21' arranged to be engaged by contacts 18, 18' respectively, when "night" handle 17 is at operating position 19 as shown in full lines in Fig. 1 of the drawing. Conductors 22, 22' connect contacts 21, 21' to lamps 30, 30', respectively, and constitute the steady illumination circuit for both right side lamps 30 and left side lamps 30'. It will be noted that in the "daytime" position of the switch with "day" handle 17' at operating position 19, contacts 21, 21' are not connected to central contact 11 and the lamps 30, 30' are normally not illuminated.

Plate 14 also carries a second pair of contacts 23, 23' arranged for engagement by contacts 16, 16' and these contacts are connected by conductors 24, 24' to each of a third pair of contacts 26, 26' also arranged for cooperation with contacts 16, 16. A conductor 27 connects contact 26 to one terminal of a pilot lamp 20 and a schematically indicated flasher unit 25, each having its other terminal connected to conductor 22 and switch contact 21. Similarly, pilot lamp 20', and flasher unit 25' are connected to conductor 22 and to contact 26' through conductor 27'.

The operation of switch 10 is as follows. In the solid line position shown in Fig. 1, both sets of lamps 30, 30' are steadily illuminated and pilot lamps 20, 20' are extinguished. This is the normal, night-time position of the switch. To indicate a left turn of the vehicle, arm 15 is moved one step counterclockwise. In this position, contact 18' engages contact 21 so that the steady illumination of right side lamps 30 is maintained. Contact 21' is disconnected, and contact 16 engages contact 23'.

Left side lamps 30' are now energized through flasher 25', and flash off and on to indicate the turn. Pilot lamp 20' flashes alternately on and off in reverse relation to the operation of flasher 25'. A corresponding effect takes place when arm 15 is moved one step clockwise from the illustrated, solid line position to indicate a right turn of the vehicle.

Should the vehicle be stopped in an emergency, a flashing warning signal by all of the lamps 30, 30' can be given. In this case arm 15 is swung 90 degrees in either direction so that arms 16, 16' engage contacts 26, 26', and arms 18, 18' do not engage any contacts. Both sets of lamps 30, 30' are energized through flashers 25, 25' with pilot lamps 20, 20' flashing in alternate relation to the closure of the flashers.

For daytime operation, arm 15 is swung 180 degrees to the dotted line position with handle 17' at position 19. In the "off" position, none of the contacts 21, 21', 23, 23', 26 or 26' is connected to "live" contact 11. However, when arm 15 is moved to the "left" or "right" position, the directional signal effect is provided in the same manner as described. Similarly, the arm 15 can be moved to the 90° "emergency" position to flush all of the clearance lamps.

Figs. 2 and 3 illustrate one form which switch 10 may assume in practice. Pilot lamps 20, 20' are mounted in sockets 31, 31'. Contacts 16, 16' comprise oppositely extending radial sections 32, 32' joined to or integral with arcuate sections 33, 33' respectively. The contacts 18, 18' comprise integral arcuate sections 34, 34' joined to contact 11 by a radial arm 36. The conductors of the lamp circuits, and flashers 25, 25' are mounted beneath plate 14 and connected to the proper contacts.

The control switch 10 provides a compact unit easily adaptable to existing lamp circuits to provide for use of clearance lamps as directional or emergency flashing signals while retaining the steady illumination feature for normal clearance indication.

While specific embodiments of the invention have been shown and described to illustrate the application of the principles thereof, it should be understood that the invention may be otherwise embodied without departing from such principles.

What is claimed is:

1. A vehicle lighting control switch comprising, in combination, an insulated base plate, a switch arm rotatably mounted on said base and carrying a pair of diametrically aligned first contacts on opposite sides of its axis and a pair of circumferentially aligned second contacts in circumferentially spaced relation to, on either side of, and radially inward of one of said first contacts; a pair of first contact means, on said plate, said first contact means being circumferentially spaced a distance equal to the circumferential spacing of said second contacts and simultaneously engageable by said second contacts; a pair of circumferentially spaced second contact means, on said plate and radially outward of said first contact means, one of which is engageable by one of said first contacts when one of said second contacts is engaged with a first contact means and the other second contact is disengaged from the other first contact means; and a third pair of contact means, diametrically aligned on said plate radially outward of said first contact means and simultaneously engageable by said first contacts when both second contacts are disengaged from said first contact means.

2. A vehicle lighting control switch comprising, in combination, an insulated base plate, a switch arm rotatably mounted on said base and carrying a pair of diametrically aligned first contacts on opposite sides of its axis and a pair of circumferentially aligned second contacts in circumferentially spaced relation to, on either side of, and radially inward of one of said first contacts; a pair of first contact means, on said plate, said first contact means being circumferentially spaced a distance equal to the circumferential spacing of said second contacts and simultaneously engageable by said second contacts; a pair of circumferentially spaced second contact means, on said plate and radially outward of said first contact means, one of which is engageable by one of said first contacts when one of said second contacts is engaged with a first contact means and the other second contact is disengaged from the other first contact means; a third pair of contact means, diametrically aligned on said plate radially outward of said first contact means and simultaneously engageable by said first contacts when both second contacts are disengaged from said first contact means, and conductive means connecting one and the other of said second contact means repectively with one and the other of said third contact means.

3. A vehicle lighting control switch comprising, in combination, an insulated base plate, a switch arm rotatably mounted on said base and carrying a pair of diametrically aligned first contacts on opposite sides of its axis and a pair of circumferentially aligned second contacts in circumferentially spaced relation to, on either side of, and radially inward of one of said first contacts; a pair of first contact means, on said plate, said first contact means being circumferentially spaced a distance equal to the circumferential spacing of said second contacts and simultaneously engageable by said second contacts; a pair of circumferentially spaced second contact means, on said plate and radially outward of said first contact means, one of which is engageable by one of said first contacts when one of said second contacts is engaged with a first contact means and the other second contact is disengaged from the other first contact means; a third pair of contact means, diametrically aligned on said plate radially outward of said first contact means and simultaneously engageable by said first contacts when both second contacts are disengaged from said first contact means; conductive means connecting one and the other of said second contact means respectively with one and the other of said third contact means; and a pair of circuit interrupters conductively connected respectively with one and the other of said third contact means.

JESSE R. HOLLINS.

REFERENCES CITED

The following references are of record in the file of this patent:

UNITED STATES PATENTS

| Number | Name | Date |
| --- | --- | --- |
| 969,055 | Hammond | Aug. 30, 1910 |
| 1,236,566 | Jameson | Aug. 14, 1917 |
| 2,060,831 | Smith | Nov. 17, 1936 |
| 2,358,332 | Kennett | Sept. 19, 1944 |
| 2,361,204 | Hollins et al. | Oct. 24, 1944 |